United States Patent [19]

De Campos

[11] Patent Number: 4,966,193

[45] Date of Patent: Oct. 30, 1990

[54] TIMING CONTROL FOR A DUAL POPPET VALVE

[75] Inventor: Hugo N. De Campos, Granger, Ind.

[73] Assignee: Allied-Signal Inc., Morristown, N.J.

[21] Appl. No.: 472,581

[22] Filed: Jan. 30, 1990

[51] Int. Cl.[5] .............................................. F16K 11/04
[52] U.S. Cl. ................................. 137/625.35; 251/77; 251/333
[58] Field of Search ...................... 137/625.35, 625.36; 251/77, 333

[56] References Cited

U.S. PATENT DOCUMENTS

| | | | |
|---|---|---|---|
| 1,896,947 | 2/1933 | Glaenzer | 137/625.35 |
| 2,634,754 | 4/1953 | Rahn | 251/333 X |
| 3,550,623 | 6/1967 | Katchka . | |
| 3,934,613 | 2/1975 | Caldwell . | |
| 4,249,572 | 2/1980 | Shindelar et al. . | |
| 4,344,449 | 5/1980 | Meyer . | |
| 4,722,507 | 9/1986 | Lindackers et al. . | |

FOREIGN PATENT DOCUMENTS 5584 of 1911 United Kingdom ........... 137/625.35

Primary Examiner—Arnold Rosenthal
Attorney, Agent, or Firm—Leo H. McCormick, Jr.; Ken C. Decker

[57] ABSTRACT

In a valve having first and second poppet members which control the flow of fluid from an entrance port to an outlet port. The valve has a cylindrical body with a center bore through which fluid from the second poppet member flows and is thereafter combined with the external fluid flow controlled by the first poppet member. A sleeve which forms a part of the second poppet member is concentric to the cylindrical body. The sleeve has a flange that is located in a groove on the peripheral surface of the cylindrical body. A flexible member is located in the groove and acts on the flange to urge the sleeve toward a stop. The cylindrical body is connected to an actuation member for moving the first and second poppet members with respect to corresponding first and second seats and allowing fluid to flow from the entrance port to the outlet port. A surface on the sleeve forms the second poppet which engages the second seat prior to the first poppet engaging said first seat as the actuation member moves the cylindrical body toward the rest position. Further movement of the cylindrical body toward the rest position, compressing the flexible member between the sleeve and cylindrical body to effect a seal therebetween and to provide a seal between the first poppet and first seat to prevent internal fluid leakage through the valve.

8 Claims, 3 Drawing Sheets

TIMING CONTROL FOR A DUAL POPPET VALVE

This invention relates to which includes timing of a balanced dual poppet valve for a fluid control device. A sleeve member of a secondary poppet is carried by a cylindrical to have and urged into interrupt with a seat on the housing of the valve by a resilient member prior to the engagement of a primary poppet to assure that flow communication through the cylindrical body terminates prior to the flow communication through the primary flow path from an entrance port to an output port in a fluid system.

In the operation of an aircraft fuel system it is not unusual for an operational fluid that is supplied to the controls to vary in temperature and pressure. In an effort to protect sealing surfaces from wear caused by the flow of fluid, various seating surfaces protection schemes have been employed. In U.S. Pat. No. 3,934,612 ceramic and carbon pads are disclosed to provide long service for such a fuel valve while in U.S. Pat. No. 3,198,481 particular surfaces on the seals are positioned to reduce seal erosion. In order to assure that no leakage occurs across a closed valve it has been disclosed in U.S. Pat. No. 4,233,695 to sequentially close series poppet valves to reduce flow to zero and eliminate internal leakage. When the physical size of a valve is relatively small, the prior art valves operate in a satisfactory manner, however when a large volume of operating fluid is required the operation of the valve requires considerable actuation force to maintain stability.

In copending U.S. patent application Ser. No. 472,527, filed Jan. 30, 1990 a balance dual poppet valve is disclosed wherein a cylindrical member is connected to an actuation member. The cylindrical body has a first end with a first poppet having a segment of a parabolic curve extending from a peripheral surface and a second end with a second poppet having a segment of a parabolic curve extending the peripheral surface. The body of the valve has a cavity or bore with a entrance port connected to a source of fluid and an outlet port connected to a fluid system. The cylindrical body is located in cavity or bore and moved by an actuation member to control the communication of fluid between the entrance port and outlet port. The space relationship between the first poppet and a first seat and the second poppet and a second seat establishes the rate at which the fluid flows to the outlet port. The interior of the bore adjacent the second end of the cylindrical body had a parabolic shape such that the path of the fluid flow from the second poppet is reversed and directed through the center of the cylindrical body. The quantity of fluid which flows past the second seat is combined with the quantity of fluid which flows past the first seat to meet the fluid demand by the positioning of the cylindrical body by the actuation member. The fluid pressure in the fluid that is presented to the bore acts on the first and second poppets in both the static and actuation state to establish substantially equal forces to create a balance valve and as a result only minimum actuation force is required to move the cylindrical body and establish the required fluid flow from the entrance port to the outlet port.

In the present invention includes the balanced dual poppet valve disclosed in U.S. patent application Ser. No. 472,527, filed Jan. 30, 1990, it was desired to have the second poppet interrupt the flow of fluid past the second seat prior to the interruption of the flow of fluid past the first seat. A sleeve member concentric to the cylindrical body has a bearing section that is located in a groove adjacent the second end of the cylindrical body. The sleeve member has a curved surface that extends from the flange and forms an extension for the segment of the parabolic curve that extends from the second end of the cylindrical body. A flexible member located in the groove on the cylindrical body acts on the bearing section of the sleeve member to urge the sleeve member toward a stop or the wall of the groove in the cylindrical body. When the actuation member moves the cylindrical body to initiate flow from the entrance port to the outlet port, the bearing of the sleeve member engages the stop or bottom of the groove such that the curved section on the sleeve forms a continuation of the segment of the parabolic surface on the second end of the cylindrical body. The sleeve surrounds the flexible member and protects the flexible member from erosion and damage as the fluid flows between the parabolic surface and second seat. When the actuation member moves the cylindrical body toward the rest position, where flow is terminated between the entrance port and outlet port, the curved section of the sleeve initially contacts the second seat to interrupt flow through the second poppet. As the actuation member moves the cylindrical body closer to the rest position, the resilient member is compressed between the sleeve and cylindrical body to form a seal to prevent internal leakage from the source into the bore. When the first poppet engages the first seat, the second poppet has already been seated and all flow from the source of fluid under pressure to the fluid system terminates.

It is an object of this invention to provide a balanced dual poppet valve with a timing mechanism whereby the flow of fluid between an entrance port and an outlet port through parallel flow paths is sequentially interrupted.

It is a further object of this invention to provide a valve with a seal that is protected from erosion by a movable sleeve that forms part of a second poppet assembly in a dual poppet arrangement.

An advantage that this invention provides over the known valves resides in a movable second poppet which allows a balanced condition to be maintained with a first poppet carried by a cylindrical body connected to an actuation member.

These objects and advantages should be apparent from reading this specification while viewing the drawings wherein.

Figure 1:
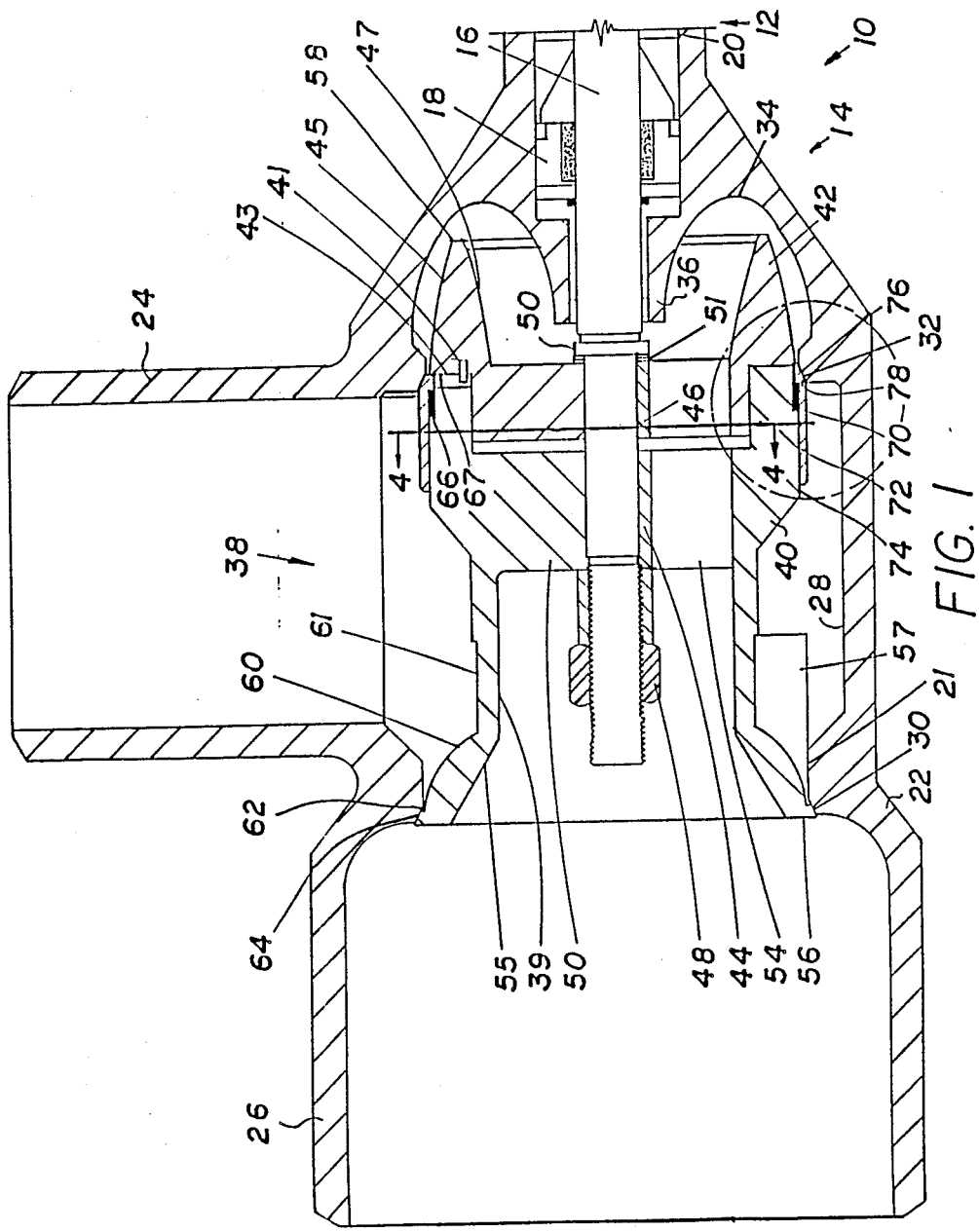
FIG. 1 is a schematic illustration of a sectional view of a valve made according to the principles of this invention.

A fuel flow control device 10 shown in FIG. 1 includes an actuation section 12 connected to a valve section 14. The actuation section 12 includes shaft seals 20, an actuation shaft or rod 16 and an actuator which is not shown. The actuation shaft or rod 16 extends through bearing member 20 located in bore 18 in the housing 22 of the valve section 14. In response to an input from an actuator, fluid under pressure from a source flows through an entrance port 24 to an outlet port 26 connected to a fluid system.

In more particular detail, the valve section has a housing 22 with a cavity or bore 28. The housing 22 has a first annular seat 30 and a second annular seat 32. The entrance port 24 is located between the first and second annular seats 30 and 32. The housing 22 has a curved surface 34 which extends from the second seat 32 to an annular section 36 that surrounds bore 18. The curved surface 34 is substantially a parabola and is selected to reverse the flow of fluid that flows past seat 32 toward the outlet port 26 without the creation of turbulence.

Figure 4:
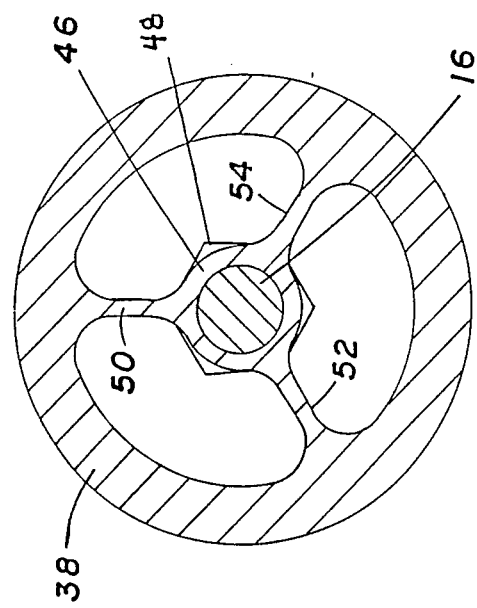
FIG. 4 is a sectional view taken along line 4—4 of FIG. 1.

A cylindrical body 38 made up of a first section 40 and a second section 42 is located in bore 28. Actuation rod 16 which passes through center hub 44 in the first section 40 has center hub 46 in the second sect-ion 42 and nut 48 attached thereto. A guide pin 41 extending from face 67 aligns the internal flow paths in the first and second sections 40 and 42. As nut 48 is tightened, hub 46 is brought into contact with shoulder 50 on actuation rod 16 such that a unitary structure is created. Under certain conditions, it may be necessary to add shims 51 between shoulder 50 and hub 46 to make sure that the first and second poppets are seated before the actuation member has moved the cylindrical body 38 to the rest position. Further, the first section 40 has a plurality of guide bearings 57 (only one is shown) which engage surface 21 to maintain the cylindrical body 38 in the axial center of the cavity or bore 28. Center hubs 44 and 46 have a series of radial spokes 50, 52, and 54, see FIG. 4, that radially extend to the interior of the cylindrical body 38. The cylindrical body 38 has a first end 56 and a second end 58. Cylindrical body 38 has a smooth bore 39 with an annular flared section 55 adjacent the first end 56. The peripheral surface of the cylindrical body 38 includes a first curved surface 60 that extends from a relative constant diameter surface 61 to a shoulder 62. The peripheral surface 64 of the shoulder 62 forming a face that engages seat 30 to define a first poppet and seat seal. The first section 40 of the cylindrical body 38 also has a groove 66 on the peripheral surface that extends to the face 67 on the end thereof. Face 43 on the end of the second section 42 forms the end wall for groove 66. The second section 42 has a peripheral curved surface 45 that extends from end 58 to face 43 and an interior curved surface 47 that extends from end 58 to spokes 50, 52, and 54. Curved surface 45 is essentially in the shape of a parabola while curved surface 47 is concentric to the parabolic surface 34 in housing 22. Thus, the interior of housing 22 and the second end 58 of the cylindrical body 38 are shaped to reduce turbulence in flow of fluid that passes around the second poppet.

Figure 3:
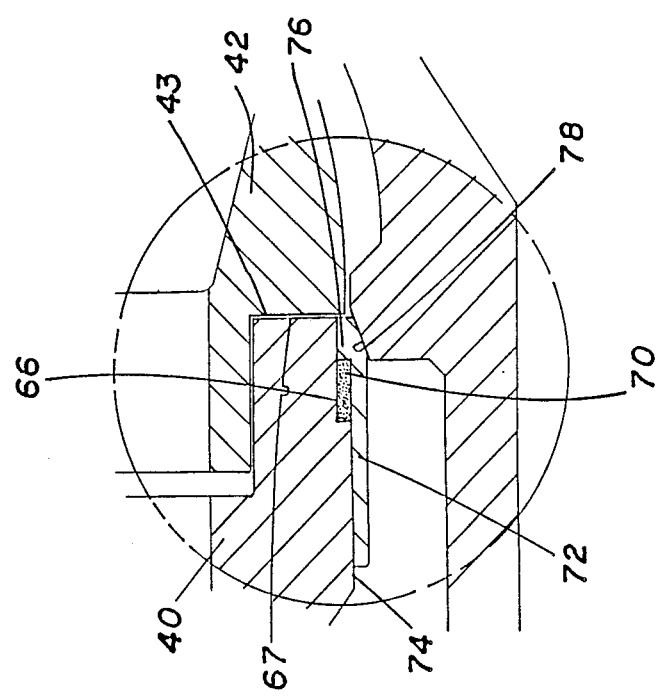
FIG. 3 is enlarged view of the circumscribed area 3 in FIG. 1.

Prior to the joining of the first section 40 with the second section 42, a flexible member 70, see FIG. 3, is located in groove 66. The flexible member 70 must be capable of withstanding varying temperature changes that occur in the supply fluid and still function in an intended manner of sealing and possessing resiliency. While many materials may possess these characteristics for this operation it has been found that laminated graphite functions the best.

A sleeve member 72, as best seen in FIG. 3, has a body section that is concentric to surface 74 on the peripheral surface of the first section 40 of cylindrical body 38. The sleeve member 72 surrounds and protects the flexible member 70 from direct contact with fluid supplied to bore 38 through the entrance port 24. A flange 76 on the sleeve member 72 which extends into groove 66 has a curved surface 78 that radially extends from the end face of the flange 76. The curved surface 78 forming a face that engages seat 32 to form a second poppet and seat seal.

Figure 2:
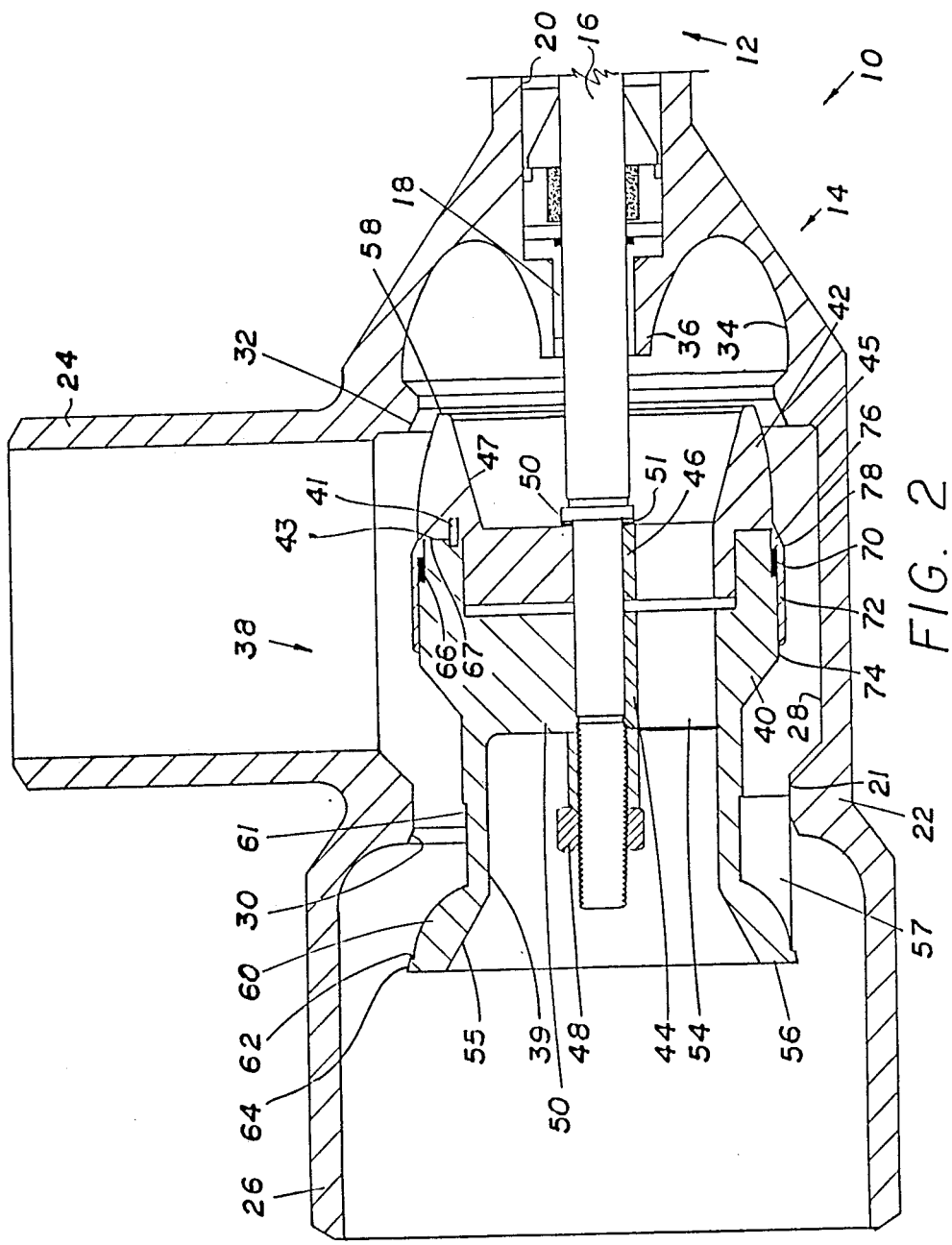
FIG. 2 is an illustration of the valve of FIG. 1 showing the position of first and second poppet member in an actuation position which allows fluid to flow from an entrance port to an outlet port.

In operation an input from the actuator moves the actuation push rod 16 which in turn moves the cylindrical body 38 to move face 64 on the first poppet away from seat 30 and allow fluid to flow directly from the entrance port 24 to the outlet port 26 in a manner as shown in FIG. 2. The space relationship between curved surface 60 and seat 30 defines a first volume or quantity of the fluid that directly flows past the first seat 30 to the outlet port 26. At the same time, a second volume or quantity of fluid flows past the second poppet to the interior of the cylindrical body 38. As the cylindrical body 38 is moved to an operation position as shown in FIG. 2, the resilient member 70 acts on the flange 76 to bring the same into engagement with a stop or face 43 on the second section 42. The curved surface 45 on the second section of the cylindrical body 38 forms a smooth transition for the flow of fluid from bore 28 to the interior of the cylindrical body 38. The space relationship between the curved surface 45 and face 32 defines the volume or quantity of fluid that flows past the second seat 32 to the interior of the cylindrical body 38. The curved surface 34 on housing 22 and curved surface 47 on the second section 42 of the cylindrical body 38 directs the second quantity of fluid to the interior bore 39 without the creation of substantial turbulence. As the second quantity fluid flows from bore 39, flare 55 allows the second quantity of fluid to be combined with the first quantity of fluid without the creation of turbulence. The first and second quantities of fluid are thereafter presented to the outlet port 26 for distribution to the fluid system to meet the demand as indicated by the position of the actuator. During the flow of fluid past the second seat 32, sleeve member 72 protects the flexible member 70 from erosion and deterioration that could occur should the fluid directly contact the flexible member 70. This flow of fluid from the entrance port 24 continues in accordance with the position of the cylindrical body 38 within bore 28. The volume of fluid is changed linearly with movement of the cylindrical body 38 because of the relationship of the curved surface 60 with seat 30 and curved surface 45 with seat 32 to meet new or different fluid requirements whenever a new input signal is supplied to the actuator.

When the demand of fluid as set by the input to the actuator terminates, the actuator moves the actuation shaft or rod 16 and cylindrical body 38, which carries the first and second poppets, toward the closing or rest position, as shown in FIG. 1. Since the fluid pressure acts on substantially the same area of the first and second poppets, the force to move the cylindrical body 38 is relatively small. As the cylindrical body 38 approaches the rest position, the curved surface 78 on sleeve member 72 of the second poppet engages seat 32 to terminate the flow of fluid past seat 32 into the interior flow path through bore 39 although a small volume fluid continues to flow past seat 30 to outlet port 26. Further movement of cylindrical body 38 toward the rest position causes sleeve 72 to slide on surface 74 of the cylindrical body 38 and compress the flexible member 70 such that a seal occurs between the sleeve 72 and groove 66 to prevent fluid from leaking into the interior of the cylindrical body 38. Flexible member 70 continues to be compressed until surface 64 on the first poppet engages seat 30 and flow from the 26 completely port 24 to the outlet port 26 terminates.

The dual poppet valve disclosed herein provides a control for a fluid system with stability and low actuation forces while accurately supplying fluid to the components in the fluid system. This dual poppet valve provides a weight reduction over known state of the art valves for fluid systems wherein varying temperatures and large volumes of fluid must be supplied within relative short time periods.

I claim:

1. In a valve having a housing with a cavity therein, said housing having an entrance port connected to a source of fluid and an outlet port connected to a fluid system, said housing having a first seat and a second seat, said valve having first and second poppets connected to an actuation member for moving the first and second poppets with respect to said first and second seats, respectively, to control the flow of fluid from the entrance port to the outlet port, the improvement comprising:
   a cylindrical body having a peripheral surface with a first curved section adjacent a first end to define said first poppet and a groove adjacent said second end, said cylindrical body having a center hub connected to the peripheral surface with a series of radial spokes, said actuation member being connected to said center hub;
   a sleeve member having a body section which is concentric to said peripheral surface on said cylindrical body, a flange section that extends into said groove on said cylindrical body and a second curved surface that radially extends from the flange section, said second curved surface defining said second poppet; and
   a flexible member located in said groove, said flexible member urging said sleeve member toward a stop on said cylindrical body, said actuation member moving said cylindrical body to allow fluid to flow directly from said cavity between said first seat and first poppet and between said second seat and second poppet, around said second end and through the interior of said cylindrical member to be combined with the fluid flow past the first seat and first poppet for distribution to said outlet port, said actuation member terminating the flow of fluid to the outlet port by moving said cylindrical member such that said second curved surface initially engages said second face to interrupt flow through said cylindrical body and thereafter compresses said flexible member until said first curved surface engages said first face to interrupt the direct flow of fluid to the outlet port, said compressed flexible member sealing said groove to prevent fluid leakage from said cavity into said fluid system.

2. The valve as recited in claim 1 wherein said first and second curved surfaces are characterized by parabolic contours that direct the flow of fluid from the entrance port to the outlet port to define a smooth and controlled flow to meet a defined schedule.

3. The valve as recited in claim 2 wherein said parabolic contours allow for a linear change in flow of fluid with a change in the position of the cylindrical body.

4. The valve as recited in claim 3 wherein said flexible member is a ring of laminated graphite that possess sufficient resiliency over a wide range of operating temperatures which acts on said flange to urge said sleeve against said stop during actuation and sufficient compressibility to seal said cavity when termination of the flow is desired.

5. The valve as recited in claim 4 wherein said engagement of said first contoured surface with said first face does not occur until after said flexible member is compressed.

6. The valve as recited in claim 5 wherein said body section of said sleeve member protects the flexible member from extrusion and direct contact with the flow of fluid to prevent deterioration of said flexible member.

7. The valve as recited in claim 6 wherein said fluid in said cavity acts on said first and second poppets with a substantially equal force during any operating position of the cylindrical body and when the fluid flow from the cavity is terminated.

8. The valve as recited in claim 7 wherein said first end of said cylindrical member has a flared surface whereby the flow of fluid through the center of the cylindrical member is added to the flow of fluid past the first seat without the creation of substantial turbulence.

* * * * *